United States Patent
Sulowski et al.

(10) Patent No.: US 9,426,550 B2
(45) Date of Patent: Aug. 23, 2016

(54) SPEAKER SYSTEM FOR A MOTOR VEHICLE

(75) Inventors: Adam Sulowski, Ingolstadt (DE); Peter Stasinski, Ingolstadt (DE); Peter Robl, Muenchsmuenster (DE)

(73) Assignee: AUDI AG, Ingolstadt (DE)

( * ) Notice: Subject to any disclaimer, the term of this patent is extended or adjusted under 35 U.S.C. 154(b) by 70 days.

(21) Appl. No.: 14/348,205

(22) PCT Filed: Sep. 14, 2012

(86) PCT No.: PCT/EP2012/003862
§ 371 (c)(1),
(2), (4) Date: Mar. 28, 2014

(87) PCT Pub. No.: WO2013/045036
PCT Pub. Date: Apr. 4, 2013

(65) Prior Publication Data
US 2014/0241547 A1 Aug. 28, 2014

(30) Foreign Application Priority Data

Sep. 29, 2011 (DE) .......................... 10 2011 115 278

(51) Int. Cl.
*H04R 1/02* (2006.01)
*B60R 11/02* (2006.01)
*H04R 1/34* (2006.01)
*B60R 11/00* (2006.01)

(52) U.S. Cl.
CPC ............ *H04R 1/025* (2013.01); *B60R 11/0217* (2013.01); *H04R 1/345* (2013.01); *B60R 2011/0021* (2013.01); *H04R 2499/13* (2013.01)

(58) Field of Classification Search
CPC ...... H04R 1/025; H04R 1/345; H04R 1/2888; H04R 1/2884; H04R 1/2896; H04R 1/2819; H04R 1/2834; H04R 1/2842; H04R 2499/13; B60R 11/0217; B60R 2011/0021
USPC ........... 381/86, 339, 340, 341, 245, 386, 387, 381/389; 181/177, 187, 189, 191
See application file for complete search history.

(56) References Cited

U.S. PATENT DOCUMENTS 4,625,829 A * 12/1986 Sirois ..................... G10K 11/28
181/141
4,728,143 A * 3/1988 Tanino ....................... B60J 5/04
296/146.7

(Continued)

FOREIGN PATENT DOCUMENTS

CN    101536538    9/2009
DE     8110984     8/1981

(Continued)

OTHER PUBLICATIONS

WIPO English Language International Preliminary Report on Patentability for PCT/EP2012/003862, mailed Apr. 3, 2014, 7 pages.

(Continued)

*Primary Examiner* — Vivian Chin
*Assistant Examiner* — Jason R Kurr
(74) *Attorney, Agent, or Firm* — Staas & Halsey LLP

(57) ABSTRACT

A loudspeaker system for a motor vehicle has at least one loudspeaker and a structure to which the loudspeaker is fitted. The at least one loudspeaker is fitted to the structure in such a manner that a longitudinal axis of the at least one loudspeaker extends at an angle between 0 and 45° relative to a plane in which the structure extends.

14 Claims, 2 Drawing Sheets

(56) References Cited

U.S. PATENT DOCUMENTS

| | | | |
|---|---|---|---|
| 6,389,147 B1 | 5/2002 | Rush et al. | |
| 6,584,202 B1 * | 6/2003 | Montag | H04R 5/02 381/1 |
| 7,313,247 B1 * | 12/2007 | Tilli | H04R 1/025 381/386 |
| 2003/0226712 A1 * | 12/2003 | Nishikawa | H04R 1/025 181/199 |
| 2004/0100123 A1 | 5/2004 | Shea | |
| 2008/0101646 A1 * | 5/2008 | Holmi | B60R 11/0217 381/389 |

FOREIGN PATENT DOCUMENTS

| | | |
|---|---|---|
| DE | 3045127 | 7/1982 |
| DE | 102011115278.8 | 9/2011 |
| EP | 0534084 | 3/1993 |
| GB | 2273847 | 6/1994 |
| WO | 2008/055253 | 5/2008 |
| WO | 2009/058441 | 5/2009 |
| WO | PCT/EP2012/003862 | 9/2012 |

OTHER PUBLICATIONS

German Office Action for German Priority Patent Application No. 10 2011 115 278.8, issued Jun. 12, 2012, 8 pages.
English Language International Search Report for PCT/EP2012/003862, mailed Nov. 22, 2012, 3 pages.
Chinese Office Action dated Aug. 4, 2015 from Chinese Patent Application No. 201280047931.6, 11 pages.
Chinese Office Action dated Apr. 18, 2016 from Chinese Patent Application No. 201280047931.6, 5 pages.

* cited by examiner

SPEAKER SYSTEM FOR A MOTOR VEHICLE

CROSS REFERENCE TO RELATED APPLICATIONS

This application is based on and hereby claims priority to International Application No. PCT/EP2012/003862 filed on Sep. 14, 2012 and German Application No. 10 2011 115 278.8 filed on Sep. 29, 2011, the contents of which are hereby incorporated by reference.

BACKGROUND

The invention relates to a loudspeaker system for a motor vehicle. The invention further relates to a motor vehicle having such a loudspeaker system.

Extremely varied embodiments of loudspeaker systems for motor vehicles are known from the general related art. The loudspeaker which acts as an electromechanical converter has the primary objective of converting the electrical energy introduced therein into air-borne sound. As a result of the moved masses of the loudspeaker, however, there are also produced, in addition to the air-borne sound, structure-borne sound portions which are introduced into a structure via the direct contact with respect to the structure in which the loudspeaker is received, for example, a door inner sheet. This often results in vibrations of this structure, whereby disruptive subsidiary noises are generated in the motor vehicle.

Since the loudspeaker is generally fitted in the direction of the greatest flexibility of the structure, the force produced by the structure-borne sound is introduced directly into the structure, which further reinforces the vibrations.

Furthermore, components which are adjacent to the structure, such as, for example, door inner linings, are also excited to vibrate which may further result in disruptive vibrations and undesirable subsidiary noises. Another problem is that the above-described effects also reduce the sound level of the primary air-borne sound of the loudspeaker, whereby the loudspeaker has to be operated at a higher power level in order to achieve the same sound level.

A loudspeaker system of the generic type is known from WO 2008/055253 A1. The longitudinal axis of the loudspeaker extends parallel with the structure in which the loudspeaker is arranged.

GB 2273847 A1 discloses a loudspeaker which a curved wall which redirects the sound produced by the loudspeaker adjoins.

US 2004/0100123 A1 discloses a loudspeaker in a vehicle whose longitudinal axis may have an angle of 45° with respect to the surface on which it is mounted.

A device for simultaneously receiving a loudspeaker and a brake light is known from DE 81 10 984 U1. The loudspeaker and the brake light are received in a common housing which is connected to the bodywork via a foot member.

SUMMARY

Therefore, one possible object is to provide a loudspeaker system for a motor vehicle, in which a smaller portion of structure-borne sound is introduced into the surrounding structure.

According to the inventors' proposals, the longitudinal axis of the loudspeaker does not extend, as is conventional, perpendicularly to the greatest structural rigidity or in the direction of the greatest flexibility of the structure, but instead at an angle of 45° relative thereto so that the structure-borne sound produced by the loudspeaker acts in the direction of a lesser flexibility of the receiving structure. The receiving structure is thereby excited to vibrate to a substantially smaller degree than is the case in conventional loudspeaker systems. Ultimately, the subsidiary noises caused by the loudspeaker can thereby be substantially reduced, which results in a clearer and better reproduction by the proposed loudspeaker system.

According to one embodiment, there is further provision for the at least one loudspeaker to be fitted in a shell-like, curved structural member which is connected directly to the structure and which is open in the direction of a door lining. As a result of a structural member formed in this manner, the air-borne sound produced by the loudspeaker is introduced into the inner space of the motor vehicle in a defined manner, which further improves the acoustic efficiency which can be achieved with the loudspeaker system. Another advantage of this solution is that the loudspeaker in this instance may be configured as an open loudspeaker and no closed or ventilated loudspeakers are necessary. As a result of the open construction of the loudspeaker, costs can be reduced in relation to a closed construction.

In another advantageous embodiment, there may be provision for two shell-like, curved structural members which are connected to the structure and between which the at least one loudspeaker is arranged to be provided. As a result of the second structural member, a greater volume which is available, for example, in a door in which the loudspeaker can be fitted, can be connected to the loudspeaker. Furthermore, the front side of the membrane of the loudspeaker is separated from the rear side thereof by the two structural members so that an acoustic short-circuit is prevented. A separation between the wet space and dry space can further be produced by the two structural members, for example, if the loudspeaker system is fitted in a door of the motor vehicle. However, the fitting of the loudspeaker in other locations of the motor vehicle is also possible with such a system, for example, in the parcel shelf or one of the lateral pillars of the motor vehicle. Another advantage of this solution is that a direct sound transmission from the outer vehicle space into the inner vehicle space is prevented.

In order to achieve particularly low transmission of the structure-borne sound into the structure surrounding the loudspeaker, there may further be provision for the longitudinal axis of the at least one loudspeaker to extend substantially parallel with the plane in which the structure extends. The structure-borne sound produced by the loudspeaker is thereby introduced in the direction of greatest rigidity of the structure, whereby the vibration of the membrane of the loudspeaker is brought about in the direction of smallest flexibility of the structure and can accordingly bring about only an extremely small deformation of the structure.

Another reduction of the structure-borne sound produced can be achieved if the at least one loudspeaker is fitted in the structure at a position at which the structure has a high level of rigidity.

The inventors also propose a motor vehicle having the proposed loudspeaker system.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
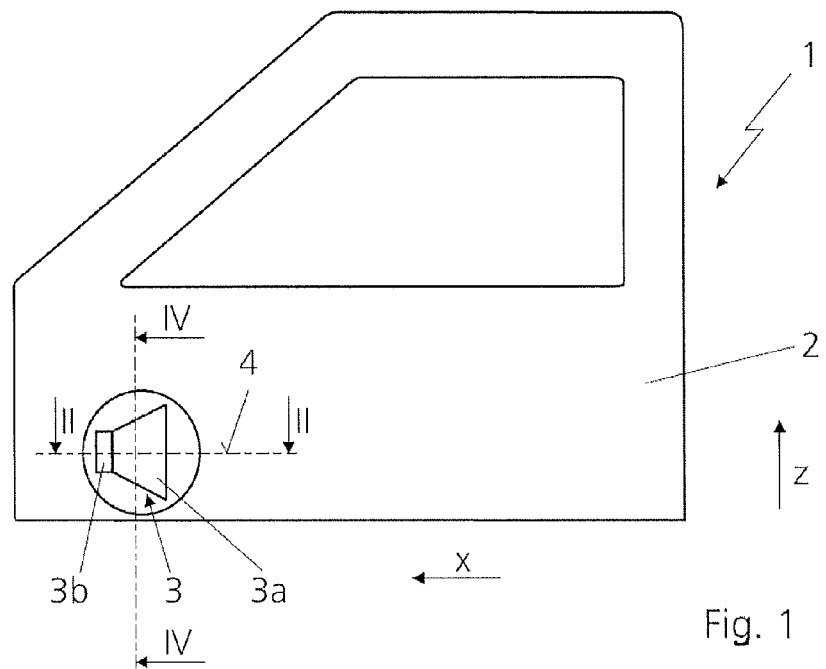
FIG. 1 is a schematic top view of a proposed loudspeaker system.

Reference will now be made in detail to the preferred embodiments of the present invention, examples of which are illustrated in the accompanying drawings, wherein like reference numerals refer to like elements throughout.

FIG. 1 is a very schematic top view of a door 1 of a motor vehicle which is not illustrated in its entirety, wherein a door lining which is conventionally fitted to the inner side of the door 1 is not present in FIG. 1. The door 1 has a structure 2 which is in the form of an intermediate plate and to which a loudspeaker 3 is fitted. The loudspeaker 3 has in a manner known per se a membrane 3a and a magnet 3b. The additional components of the loudspeaker 3 are not indicated with a reference numeral in the present case because they are not significant to this discussion. The loudspeaker system described below is always illustrated by way of example with only one loudspeaker 3 but it could also have a plurality of loudspeakers 3.

The structure 2 extends in a substantially vertical plane which is designated the xz plane in the motor vehicle. The surface normal of the plane in which the structure 2 extends is accordingly the y direction extending in the transverse direction of the vehicle. The illustration of FIG. 1 shows that the longitudinal axis (designated 4) of the loudspeaker 3 extends substantially parallel with the plane in which the structure 2 extends. The longitudinal axis 4 is the axis which extends in the longitudinal direction through the magnet 3b of the loudspeaker 3. The longitudinal axis 4 of the loudspeaker 3 generally extends at an angle between 0 and 45° relative to the plane in which the structure 2 extends. As a result of this arrangement of the loudspeaker 3, the structure-borne sound portions which are produced by the loudspeaker 3 in addition to the actual air-borne sound and which are particularly dispersed in the direction of the longitudinal axis 4 of the loudspeaker 3 deform the structure 2 only to a small extent since the structure 2 has a high level of rigidity in the direction in which the structure-borne sound acts thereon. Substantially fewer disruptive noises are thereby produced than in known loudspeaker systems. Furthermore, it can be seen in FIG. 1 that the loudspeaker 3 is fitted inside the structure 2 at a position at which the structure has a high level of rigidity, that is to say, in the present case in the region of the front, lower corner of the structure 2.

Figure 2:
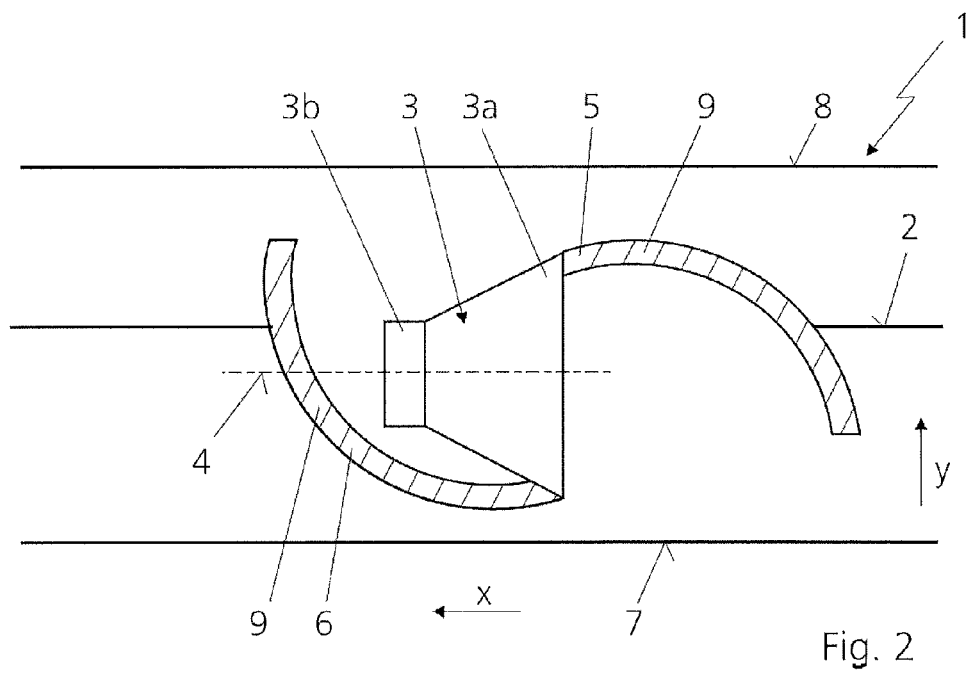
FIG. 2 is a section along the line II-II from FIG. 1.

In the section according to FIG. 2, it can be seen that the loudspeaker 3 is fitted in a shell-like, curved structural member 5 which is connected to the structure 2. In the embodiment illustrated, two shell-like, curved structural members 5 and 6, between which the loudspeaker 3 is arranged, are provided. In this instance, the rear structural member 5 in the travel direction x is opened in the direction of a door lining 7 so that the air-borne sound produced by the loudspeaker 3 is directed by the structural member 5 in the direction of the inner space of the motor vehicle. As a result of the structural member 5, therefore, a selective sound guiding action is possible. However, the front structural member 6 is directed towards an outer sheet 8 of the door 1, whereby an additional volume, that is to say, in the present case the volume located between the structure 2 and the outer sheet 8, is connected to the loudspeaker 3 inside the door 1. Therefore, an open construction of the loudspeaker 3 which uses the volume of the door 1 is involved.

The two structural members 5 and 6 connected to each other via the loudspeaker 3 separate the front side of the membrane 3a from the rear side thereof so that an acoustic short-circuit is prevented. Furthermore, the two structural members 5 and 6 together with the structure 2 separate a wet region located between the structure 2 and the outer sheet 8 from a dry region which is located between the structure 2 and the door lining 7, whereby the sealing action of the door 1 is ensured. The structure-borne sound produced by the loudspeaker 3 is introduced into the structure 2 via the two structural members 5 and 6.

As can be seen in FIG. 2, the two structural members 5 and 6 are in cross-section in the form of approximate quarter-circles, between which the loudspeaker 3 is mounted. At the inner side of the two structural members 5 and 6, that is to say, at the side thereof directed towards the loudspeaker 3, there is further provided an absorption material 9 which can be adjusted so that a selective sound absorption action is possible. The two structural members 5 and 6 comprising, for example, plastics material can be produced in a very simple injection molding tool. In particular, it is possible to construct the structural members 5 and 6 in one piece with each other. The connection of the structural members 5 and 6 with respect to the structure 2 can be carried out with connection methods which are known per se. The loudspeaker 3 can be preassembled in the two structural members 5 and 6 so that a combination of the two structural members 5 and 6 with the loudspeaker 3 can be fitted in the structure 2, which allows simple assembly.

Figure 3:
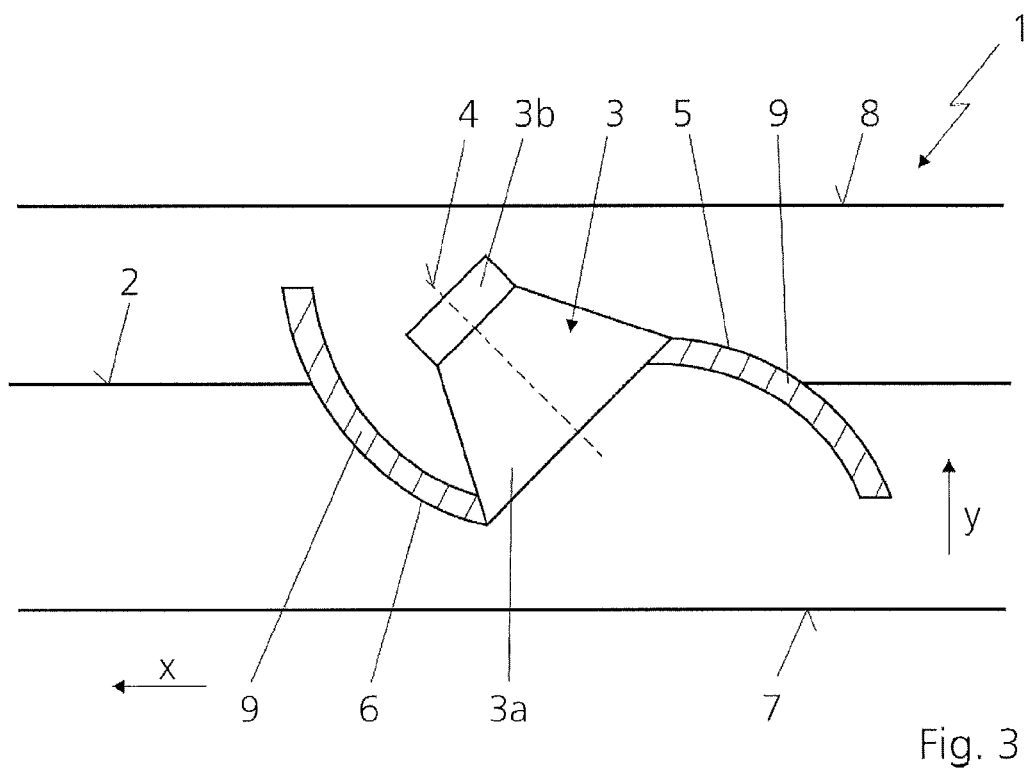
FIG. 3 is a loudspeaker system according to another proposed embodiment.

FIG. 3 illustrates an alternative embodiment with respect to the loudspeaker system according to FIG. 2. The longitudinal axis 4 of the loudspeaker 3 has an angle of approximately 45° relative to the plane in which the structure 2 extends. Although higher forces are introduced into the structure 2 in this manner, those forces are substantially smaller with respect to the conventional construction type, whereby a smaller vibration of the structure 2 is achieved. The advantage of such an arrangement of the loudspeakers 3 at an angle other than 0° is the smaller structural depth which may be necessary in specific embodiments of the door 1. The angle at which the longitudinal axis 4 extends relative to the plane in which the structure 2 extends is therefore a compromise between a small vibration excitation of the structure 2 and a small structural depth. Therefore, the angle at which the longitudinal axis 4 extends relative to the plane in which the structure 2 extends may be between 0 and 45°. As a result of the installation situation of the loudspeaker 3 illustrated in FIGS. 2 and 3, it is further possible to fit a larger magnet 3b than usual.

Figure 4:
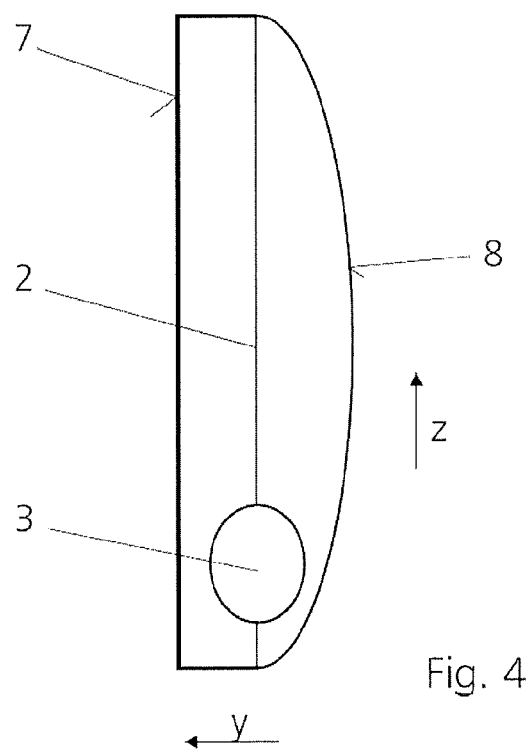
FIG. 4 is a section along the line IV-IV from FIG. 1.

FIG. 4 is a cross-section of the arrangement of the loudspeaker 3 inside the door 1, that is to say, between the outer sheet 8 and the door lining 7. In order to reduce the structural depth of the loudspeaker system, the membrane 3a of the loudspeaker 3 is constructed so as to be oval or elliptical in the embodiment illustrated. In principle, however, rectangular, round or other shapes of the membrane 3a are also possible. Furthermore, ribbon loudspeakers or exciter drivers may also be used.

The door lining 7 may have a storage pocket which is not illustrated and in which, for example, drinks bottles may be stored. In this instance, the two structural members 5 and 6, preferably the rear structural member 5, can be adapted to the shape of this receiving pocket.

Only one door 1 of the motor vehicle is illustrated in the Figures but preferably doors having corresponding structures 2, in which at least one loudspeaker 3 is fitted, are located at each of the two sides of the motor vehicle. In this instance, the structural members 5 and where applicable 6 can be constructed in a substantially identical manner at both sides and, for example, be fitted in a mirror-inverted manner. As a result of this identical construction, one and the same tool can be used for both sides and only mirror-inverted installation is necessary.

Alternatively to the installation in the door 1, the at least one loudspeaker 3 may also be fitted in another component of the motor vehicle, for example, in an A-pillar, B-pillar or C-pillar, in the parcel shelf, in an instrument console or in another region thereof. In this instance, the structure 2 is formed by another component, for example, by the parcel shelf. When the loudspeaker 3 is installed in a parcel shelf, a head-rest could be located in front of the loudspeaker 3, for example, so that the structural member 5 can be slightly raised relative to the surface of the parcel shelf.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A loudspeaker system for a motor vehicle, comprising:
a mounting element extending in a plane, the mounting element being formed by an intermediate plate of a door of the motor vehicle;
a loudspeaker mounted to the mounting element such that a longitudinal axis of the loudspeaker extends at an angle between 0° and 45° relative to the plane in which the mounting element extends; and
a shell-shaped, curved structural member connected directly to the mounting element at a point between one end of the structural member which is connected to the loudspeaker and another end of the structural member, the loudspeaker being fitted in the structural member to mount the loudspeaker to the mounting element, the structural member being open in a direction of a door lining,
wherein the structural member is connected to the loudspeaker at the one end and then extends from a sound projection side of the loudspeaker toward a direction in which a sound wave is projected from the loudspeaker, and the another end of the structural member terminates on a same side as the sound projection side of the loudspeaker and is spaced apart from the loudspeaker.

2. The loudspeaker system as claimed in claim 1, wherein the loudspeaker system has first and second shell-shaped, curved structural members,
each of the structural members is connected to the mounting element,
the loudspeaker is fitted between the first and second structural members, and
the first structural member is open in the direction of the door lining and the second structural member is open in a direction of an outer sheet of the door.

3. The loudspeaker system as claimed in claim 2, wherein each of the first and second structural members has a cross-sectional shape that approximates a quarter-circle.

4. The loudspeaker system as claimed in claim 1, wherein the longitudinal axis of the loudspeaker extends substantially parallel with the plane in which the mounting element extends.

5. The loudspeaker system as claimed in claim 1, wherein the mounting element has a position with a higher level of rigidity and a position with a lower level of rigidity, and the loudspeaker is mounted to the mounting element at the position with the higher level of rigidity.

6. The loudspeaker system as claimed in claim 1, wherein the loudspeaker has a membrane which is oval, elliptical, round or rectangular.

7. The loudspeaker system as claimed in claim 1, wherein the loudspeaker has an oval membrane with a minor axis and a major axis, and
the major axis is substantially parallel to the plane in which the mounting element extends.

8. The loudspeaker system as claimed in claim 1, wherein the loudspeaker system has first and second mounting elements, first and second loudspeakers and first and second structural members,
the first and second structural members are substantially identical,
the first and second mounting elements are positioned at different sides of the motor vehicle,
the first loudspeaker is fitted in the first structural member to mount the first loudspeaker to the first mounting element, and
the second loudspeaker is fitted in the second structural member to mount the second loudspeaker to the second mounting element.

9. The loudspeaker system as claimed in claim 8, wherein the first and second mounting elements are positioned in opposing doors of the motor vehicle.

10. The loudspeaker system as claimed in claim 1, wherein the loudspeaker comprises a magnet portion and a membrane portion,
the loudspeaker system has first and second shell-shaped, curved structural members,
one end of the first structural member is connected to a front side of the membrane portion, and
one end of the second structural member is connected to a rear side of the membrane portion.

11. The loudspeaker system as claimed in claim 10, wherein
the first structural member extends from the front side of the membrane such that the one end of the first structural member is disposed on one side of the longitudinal axis of the loudspeaker and another end of the first structural member is disposed on another side of the longitudinal axis of the loudspeaker, and
the second structural member extends from the rear side of the membrane such that the one end of the second structural member is disposed on the another side of the longitudinal axis of the loudspeaker and another end of the second structural member is disposed on the one side of the longitudinal axis of the loudspeaker.

12. The loudspeaker system as claimed in claim 10, wherein
the first structural member extends from the front side of the membrane such that the one end of the first structural member is disposed on one side of the plane in which the mounting element extends and another end of the first structural member is disposed on another side of the plane in which the mounting element extends, and
the second structural member extends from the rear side of the membrane such that the one end of the second structural member is disposed on the another side of the plane in which the mounting element extends and another end of the second structural member is disposed on the one side of the plane in which the mounting element extends.

13. A motor vehicle, comprising:
a passenger compartment;
a vehicle door having an outer sheet, an intermediate plate and a door lining, the door lining facing the passenger compartment, the intermediate plate extending in a plane and serving as a mounting element;
a loudspeaker mounted to the mounting element such that a longitudinal axis of the loudspeaker extends at an angle between 0° and 45° relative to the plane in which the intermediate plate extends; and
a shell-shaped, curved structural member connected directly to the mounting element at a point between one end of the structural member which is connected to the loudspeaker and another end of the structural member, the loudspeaker being fitted in the structural member to mount the loudspeaker to the mounting element, the structural member being open in a direction of a door lining,
wherein the structural member is connected to the loudspeaker at the one end and then extends from a sound projection side of the loudspeaker toward a direction in which a sound wave is projected from the loudspeaker, and the another end of the structural member terminates on a same side as the sound projection side of the loudspeaker and is spaced apart from the loudspeaker.

14. The motor vehicle as claimed in claim 13, wherein
the loudspeaker has a magnet side and the sound projection side, opposite the magnet side,
the motor vehicle has first and second shell-shaped, curved structural members,
each of the structural members is connected to the mounting element,
the loudspeaker is fitted between the first and second structural members,
the first structural member is open in the direction of the door lining to open the sound projection side to the passenger compartment, and
the second structural member is open in a direction of the outer sheet of the door to open the magnet side to the outer sheet of the door.

* * * * *